United States Patent

Schlesinger et al.

[11] Patent Number: 4,530,699
[45] Date of Patent: Jul. 23, 1985

[54] DENSE PHASE PRECIPITATION

[75] Inventors: Allen H. Schlesinger, New Athens, Ill.; L. Keith Hudson, Oakmont, Pa.; William M. Fish, Western Australia, Australia

[73] Assignee: Aluminum Company of America, Pittsburgh, Pa.

[21] Appl. No.: 4,326

[22] Filed: Jan. 18, 1979

[51] Int. Cl.³ .............................. B30B 9/02
[52] U.S. Cl. .................. 23/30; 23/305 A
[58] Field of Search ........ 23/295, 298, 301, 23/305 A, 305 R; 423/122, 121, 625

[56] References Cited

U.S. PATENT DOCUMENTS

| 1,943,786 | 1/1934 | Cowles | 423/625 |
| 2,219,776 | 10/1940 | Henderson | 23/301 R |
| 2,653,858 | 9/1953 | Brown | 423/629 |
| 4,049,773 | 9/1977 | Mejdell et al. | 423/127 |

FOREIGN PATENT DOCUMENTS

| 232566 | 10/1959 | Australia | 423/122 |
| 1068369 | 6/1954 | France | |
| 1187352 | 9/1959 | France | |
| 653741 | 5/1951 | United Kingdom | 423/122 |

OTHER PUBLICATIONS

Chemical Abstracts, vol. 52, p. 17635(c).

Primary Examiner—Hiram H. Bernstein
Attorney, Agent, or Firm—Daniel A. Sullivan, Jr.

[57] ABSTRACT

A system for the precipitation of $Al(OH)_3$ from green liquor is provided which comprises process and apparatus for feeding the green liquor into the bottom of a chamber containing a supersaturated solution of alumina and $Al(OH)_3$ seed particles. The flow of green liquor into the bottom of the chamber is maintained at a rate sufficient to suspend the seed particles in the chamber with minimum turbulence so that the liquor is in approximately plug flow. As $Al(OH)_3$ precipitates on the seed particles, the particles grow larger and gradually move to the bottom of the chamber where they are removed. The solution, somewhat depleted with respect to $Al_2O_3$, overflows the chamber to return to the process.

7 Claims, 2 Drawing Figures

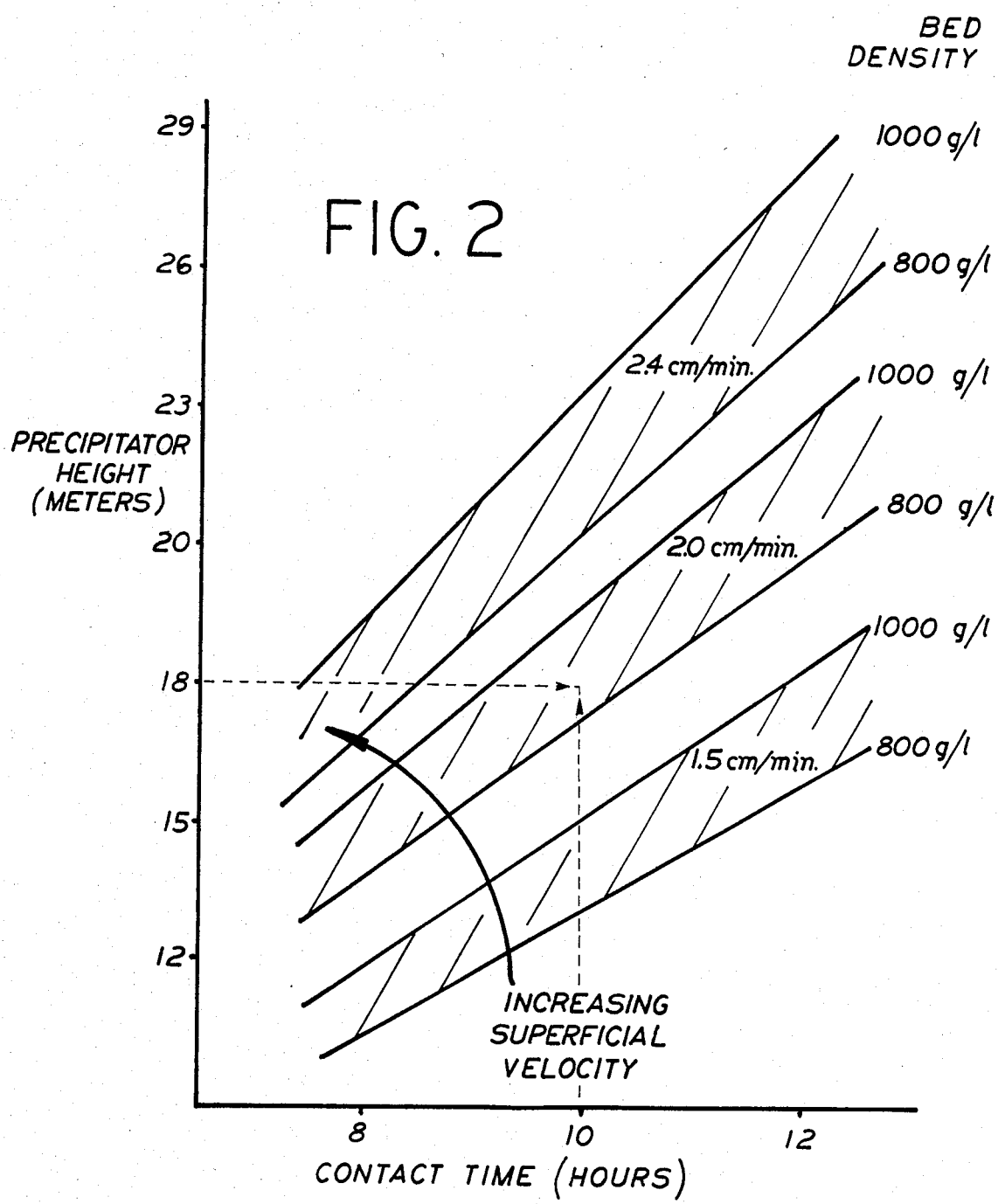

1

DENSE PHASE PRECIPITATION

BACKGROUND OF THE INVENTION

This invention relates to the production of Al(OH)₃ and more particularly to the precipitation of Al(OH)₃ from a Bayer green liquor.

Conventionally, in the recovery of Al(OH)₃ in the Bayer process, raw materials such as bauxite are digested in caustic followed by removal of the red mud residue from the resulting green or pregnant liquor prior to precipitation. Seed particles are then introduced into the green liquor in a number of precipitation tanks well agitated to maintain seed and liquor contact in which precipitation is carried out by hydrolysis according to the following reaction:

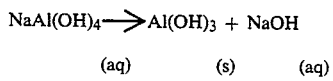

The hydrolysis reaction proceeds slowly, normally over a period of 20 to 60 hours, the rate being a function of temperature, seed surface area, and concentrations of caustic, alumina, and impurities. The Al(OH)₃ is then classified by hydraulic elutriation with the separated product size fraction removed for calcination where the chemically combined water is driven off at high temperatures. Finer particles are recycled as seed. Depleted or spent liquor leaving the precipitation tank is evaporated and recycled to the digester.

While this process has been very successfully carried out through the years to produce high quality Al(OH)₃ suitable for subsequent calcination and use in a smelter for the production of metallic aluminum, there are some shortcomings to the process. Because of the slow reaction rate, as mentioned above, a number of precipitation tanks are required to handle the large volume of green liquor. The process also requires a subsequent classification step wherein larger product size particles are recovered for ultimate use in either smelting or chemical application while the smaller seed particles are returned to the precipitation tanks. Alternatively, filtration is employed to effect separation of Al(OH)₃ from liquor.

Alternate or modified precipitation methods are known. For example, Cowles U.S. Pat. No. 1,943,786, suspends particles of Al(OH)₃ in a precipitation tank by the introduction of liquor into the bottom of the tank. The liquor is also introduced into the top of the tank and then drawn off to be pumped into the bottom of the tank resulting in mixing and essentially uniform concentrations throughout the tanks.

Mejdell et al U.S. Pat. No. 4,049,773, discloses a multiple stage precipitation process in which green liquor is fed counter-current to the direction of feed of the Al(OH)₃ crystals through at least two stages. The patentees show turbulent zones in each of the precipitators which may be obtained by using an agitator.

SUMMARY OF THE INVENTION

It is an object of the present invention to provide a new method of precipitation which neither requires the large volumes and long time periods of conventional precipitation methods nor turbulent mixing of alternate methods of precipitation.

In accordance with the invention, a seed bed suspension of Al(OH)₃ particles in Bayer process (green) liquor is established in a precipitator vessel. The green liquor, supersaturated with respect to NaAl(OH)₄, is admitted to the bottom of the precipitator vessel at such a rate that the seed particles are dispersed and suspended but not made turbulent or fluidized. The liquor flow through the seed bed suspension approximates plug flow thereby establishing an expanded bed with a liquor concentration gradient with respect to alumina decreasing from bottom to top of the vessel. The upward flow serves also to slowly classify the solids composed of seed and precipitated Al(OH)₃, so that coarse particles can be withdrawn from the bottom of the vessel. Fine seed is added to the top of the precipitator vessel to maintain the bed of solids as coarse product is withdrawn.

BRIEF DESCRIPTION OF THE DRAWINGS

FIG. 2 is a graph illustrating parameters of the invention.

DESCRIPTION OF THE PREFERRED EMBODIMENT

Figure 1:
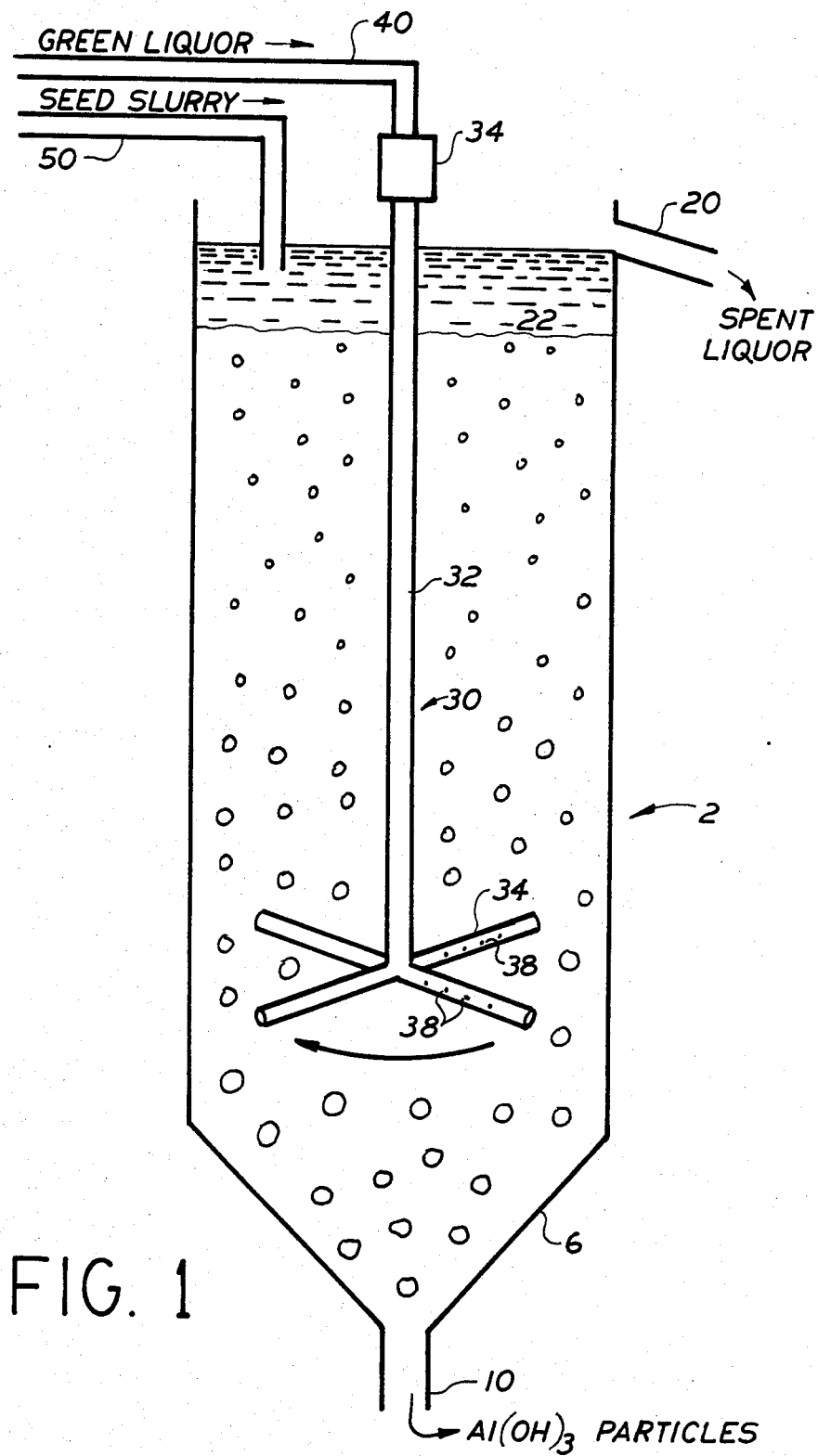
FIG. 1 is a flow sheet vertical cross-section of the dense phase precipitator of the invention.

Turning now to FIG. 1 a precipitation vessel is generally shown at 2 which may comprise a vertical cylinder 4 having a conically shaped or a flat bottom portion 6 terminating in an outlet 10. Adjacent to the top of the vertical cylinder is an overflow outlet 20. Within cylinder 4 is mounted a rotating sparger 30 comprising a vertical pipe 32 and horizontal sparging arms 34. Sparger 30 is rotated by rotational means 36 mounted on vertical pipe 32.

In operation, green liquor from a Bayer digestion process is fed from line 40 into precipitation vessel 2 by flowing down vertical pipe 32 and into the sparger arms 34 and out holes 38 located on the sparger arms. At the same time seed slurry is fed into the top of precipitation vessel 2. The sparger arms are slowly rotated to evenly distribute the green liquor into precipitation vessel 2. The green liquor entering vessel 2 suspends the Al(OH)₃ particles and at the same time provides a source of Al(OH)₃ which precipitates onto the particles. A seed bed suspension or expanded bed is thus established within vessel 2 below the level of entry of the particles into the vessel. The seed particles entering the top of the bed of particles slowly grow by contact with the liquor from which further Al(OH)₃ is precipitated thereon. As the particles thus grow, they descend in the bed and, as they descend, they contact green liquor of more concentrated strength. Finally, the particles become large enough to fall into the bottom portion 6 of the vessel from which they then can be removed by outlet 10. At the same time, the green liquor, moving upwardly in precipitation vessel 2, gradually becomes depleted in its dissolved aluminum values via precipitation. Above the bed of particles, the liquor forms a zone 22 almost completely free of any particles. The liquor in this zone then overflows and exits precipitation vessel 2 via exit port 20. The spent liquor can then be recycled back to the digester.

In accordance with the invention, the concentration of seed particles within the precipitator is much higher than that found in conventional precipitators. For example, while a typical air lift precipitator might have a seed solids density of about 150-200 grams/liter, the dense phase precipitator of the invention can maintain a seed suspension density or solids density therein of from about 500 to 1100 grams/liter. Preferred suspension density depends on the particle size and the liquor flow rate. Some particles will be created within the bed during the precipitation. However, additional seed slurry should be constantly fed into the bed to maintain the desired high concentration of seed particles. While the amount needed to supplement the actual precipitation will vary in accordance with other parameters of the particular precipitation vessel such as size, temperature, velocity flow of the green liquor, etc., supplement the amount of required may be determined by monitoring the concentration and depth of the seed bed suspension within the precipitation vessel.

The green liquor entering the precipitation vessel is a supersaturated aluminate liquor preferably having a ratio of alumina concentration to total caustic (expressed as the sodium carbonate equivalent) concentration (A/TC) of approximately 0.560 to 0.680. The rate of entry of the green liquor will vary with the parameters of the precipitation. However, the flow should be sufficient to provide a superficial velocity high enough to suspend the seed particles. Normally this superficial velocity is in the range of 1.0 to 3.0 centimeters per minute. Furthermore, this flow can be further defined as sufficient to move the liquor among the particles in approximately plug flow thus to maintain a concentration gradient throughout the vessel, rather than creating a turbulent fluidized bed.

As the green liquor flows through the sparger and out sparger holes 38, the sparger arms are slowly rotated to provide essentially uniform distribution of the green liquor across the area of the precipitator vessel. While the speed of rotation will vary with the dimensions of the vessel, a speed providing new liquor to each area at least about 20 times per minute has been found to be satisfactory. In accordance with the preferred embodiment of the invention, holes 38 are positioned on the sparger arms in the direction of the rotation of the sparger arms. It has been found that this permits the green liquor exiting the sparger arms by holes 38 to clear a path through the particles surrounding the sparger arms and therefore lower the torque needed to maintain the rotation of the sparger arms.

The temperature within the dense phase precipitator preferably is maintained at about 50°–80° C. (122°–180° F.).

The feed rate of the seed slurry should be sufficient to maintain a density within the precipitator of from 500–1100 grams of solid per liter of solid-slurry mixture. The seed particles should be at least about 20 microns and preferably less than 150 microns in diameter, depending on desired product size and other parameters. The seed may be added while dispersed in spent liquor (i.e. a liquor having an alumina ($Al_2O_3$) to total caustic (as $Na_2CO_3$) ratio typically of 0.360), or may be fed as a filter cake.

The green liquor has an alumina concentration of about 110–140 grams per liter, a caustic concentration (expressed as $Na_2CO_3$) of about 150–200 grams per liter and a carbonate concentration ($Na_2CO_3$) of 35–70 grams/liter. The alumina to total caustic ratio typically is about 0.630 but could vary in the range of 0.560 to 0.680.

The particle size of the exiting product can be controlled by proper selection of parameters such as seed size, seed quantity, and green liquor flow. The preferred size range of the product is between 50 and 150 microns.

The green liquor is fed into the bed at a rate sufficient to provide a superficial velocity of 1–3 cm/min., and preferably about 1.6–2 cm/min. This rate will provide a flow of liquor sufficient to cause the seed bed suspension to expand slightly to create a condition of plug flow without turbulent particulate fluidization. Under this condition, the individual particles suspended by the upward liquor flow move randomly within a region bound by neighboring particles. The bed takes on the appearance of a quiescent fluid exhibiting no gross turbulence or regular patterns of particle movement. Thus, unlike a fluidized bed of uniform concentration, gradients will be maintained. The smallest particles at the top of the bed will be in contact with liquor of low alumina concentration and will grow by precipitation as they move downwardly. The liquor is most concentrated with respect to $Al_2O_3$ at its entry adjacent the bottom of the tank and gradually decreases in $Al_2O_3$ concentration as it moves upwardly. Thus, the counter-current movement of green liquor and seed provide the highest surface ares of seed at the location where the liquor has the lowest alumina concentration, thereby maximizing the precipitation rate.

The parameters of flow rates and contact times are, of course dependent upon the cross-section and height of the particular precipitation tank. Table I below shows the interrelationship between tank diameter, superficial velocity, and green liquor flow:

TABLE I

| Diameter m | Superficial Velocity cm/min | Green Liquor Flow $m^3$/min |
|---|---|---|
| 6 | 1.5 | 0.45 |
| 6 | 2.4 | 0.70 |
| 7 | 1.5 | 0.65 |
| 7 | 2.4 | 1.00 |
| 9 | 1.5 | 1.00 |
| 9 | 2.4 | 1.60 |

The choice of seed bed height is controlled largely by the particle size of the desired product and the amount of $Al_2O_3$ to be precipitated from each volume of liquor. As the desired product size increases, the upward velocity required to achieve the expanded seed bed suspension increases. The seed area per unit of seed weight available for precipitation decreases as the particles become larger. Increasing the product size therefore requires increasing the seed bed depth both to maintain the time of contact between liquor and seed and to provide sufficient seed area. Further, at a given product size, an increase in depth of seed bed suspension will increase the amount of $Al_2O_3$ precipitated since the time of contact between liquor and seed will be increased.

FIG. 2 illustrates the relationships between seed suspension density, superficial velocity, liquor-seed contact time and seed bed suspension height. The two dotted lines show that, with a seed bed suspension containing approximately 900 g/l solids and a superficial velocity of 2.0 cm/min, a seed bed suspension depth of 18 meters will provide a liquor-seed contact time of 10 hours. Note that the actual liquor velocity exceeds the superficial velocity because of the volume occupied by the seed solids.

To provide the desired suspension of the particles via introduction of the green liquor to the bottom of the precipitation tank without the creation of undesirable turbulence which would disturb the desired concentration gradients of particles and liquor saturation, it is necessary to provide a uniform distribution of the green liquor into the bottom of the tank. While this could probably be done using a distribution plate properly designed to permit removal of the large particles, such a plate would be subject to scale deposition. A preferred method of green liquor introduction is via a rotating sparger. The sparger is provided with at least two radial arms spaced at equal angles and having holes therein facing the direction of rotation. The size and number of holes are selected to provide the desired flow rate without excessive pressure drop and for the particular size tank to achieve the desired upward velocity of 1-3 cm/minute. The spacing between holes, the rotation speed, and the total number of arms needed on the sparger will also vary with the diameter of the tank. However, the rotational speed and number of arms should be sufficient that a sparger arm sweeps past a given point in the cross section of the tank every 3 seconds.

The holes in the sparger arms are positioned facing the direction of rotation of the sparger arms to permit the green liquor flow to wash the alumina particles away from the path of the arms thus reducing the drag or torque of rotation which in turn will lower the energy requirements for rotating the sparger. This will also lower the torque requirement for starting a stalled sparger following any interruption in the rotation and/or green liquor flow. Lowering of the required torque will also permit a lighter-weight construction of the sparger arms. Spacing of the holes should provide approximately equal liquor flow to each area element of the precipitator cross section.

To further illustrate the invention, a dense phase precipitator 9.1 m high and 5.08 cm in diameter (representing a vertical section through a full-scale version of much larger diameter), was continuously fed through the bottom with an industrial sodium aluminate solution of high concentration of alumina to total caustic (caustic as $Na_2CO_3$ targeted at 170 g/l, $Al_2O_3$ targeted at 114 g/l, and carbonate as $Na_2CO_3$ at approximately 38 g/l). Initially an 8 m high seed bed suspension was formed by addition of $Al(OH)_3$ in a size range of 74-105 microns (90 micron average). Liquor flowing upward through the bed at a superficial velocity of 1.6 cm/min (feed rate approximately 1.8 liters/hour) served to establish an expanded seed bed suspension having an average solids density of approximately 740 g/l. Liquor overflow temperature was controlled at 65° C. by means of a water-jacket with tempered water circulating therein. Sized particles of $Al(OH)_3$ (90μ average diameter) in spent liquor were added to the top of the precipitator as seed. Seeding and product withdrawal were conducted intermittently and in a manner such that seed plus $Al(OH)_3$ yield equalled the product draw-off rate, thereby maintaining the seed bed suspension height.

The dense phase precipitator, operated for 5 days in the configuration described above, demonstrated the rate enhancing effect of plug flow of green liquor through an expanded seed bed suspension of $Al(OH)_3$ of hydrate containing a high solids content, as shown in Tables II and III. Note for example that during Day-2, green liquor having an alumina/total caustic ratio of 0.667 was stripped of its $Al_2O_3$ content to a 0.398 A/TC ratio in a bed 7.45 m high having an average solids density of 810 g/l. In a traditional Bayer precipitation process, such a change would have required at least 3 times as long a reaction time. Additional data characterizing the operation of the dense phase precipitator are also included in Table III. The run was shut-down due to operating problems after Day-3 and re-started using the same seed bed. Time on spent liquor feed was allotted to re-establish the bed before switching from spent liquor to green liquor feed.

Table IV lists hydrate size and attrition resistance data for product made during the 5-day run. Note the coarseness of the product removed from the bottom of the precipitator and the absence of fines indicating the internal classification occurring in the precipitator. In the latter half of the run note that the seed addition rate was increased so as to reduce coarseness of the product. Alternatively, a smaller sized product could have been made by the addition of finer seed. The resistance of the calcined product to breakdown was measured by a modified Forsythe-Hertwig test in which calcined product was fluidized under controlled conditions and the production of fine particles was measured. Attrition indices calculated from these tests are shown but should be viewed with discretion. It should be noted that at the production rate of the unit it would take approximately 80 hours to completely replace the initial seed bed. Therefore, during much of this run the relatively low resistance to breakage of the seed material is reflected in the product.

A gradation in solids density, liquor concentration and $Al(OH)_3$ particle size is established from top to bottom in the dense phase precipitator operating under the influence of plug flow of liquor through an expanded seed bed suspension. Samples were obtained in the following manner upon shut-down of the 5-day run. While maintaining the green liquor flow, slurry was rapidly drained incrementally as volume was measured from the bottom of the precipitator. Liquor samples were rapidly taken from each sample and stabilized prior to analysis. Slurries were stabilized and later filtered for determination of solids density and $Al(OH)_3$ size at a particular level in the precipitator. The assumption in the above technique was that the small diameter precipitator drained in plug-flow fashion. Also, the rapid sampling in conjunction with maintaining upward flow while draining served to improve the sampling technique. The gradations from top to bottom in the precipitator are distinctly shown by the data in Table V for solids density in the seed bed suspension, $Al_2O_3$ concentration, and $Al(OH)_3$ particle size. Note that the resistance to breakage of the product is higher for samples taken from the bottom of the precipitator. This reinforces the premise that the product is toughened as it descends through the precipitator while agglomerating and growing under the influence of higher and higher alumina concentration driving forces (supersaturation).

TABLE II

OPERATING DATA

| Day | Period Hours | Feed Liquor[1] $Al_2O_3$ g/l | TC g/l | A/TC Ratio | Overflow Liquor[1] $Al_2O_3$ g/l | TC g/l | A/TC Ratio | Temp °C. |
|---|---|---|---|---|---|---|---|---|
| 1 | 0-8 | 128.2 | 195.7 | .655 | (2) | (2) | (2) | (2) |
|   | 8-16 | 142.8 | 217.9 | .655 | 80.0 | 201.8 | .396 | 62.5 |

TABLE II-continued

OPERATING DATA

| | | Feed Liquor[1] | | | Overflow Liquor[1] | | | |
|---|---|---|---|---|---|---|---|---|
| Day | Period Hours | Al$_2$O$_3$ g/l | TC g/l | A/TC Ratio | Al$_2$O$_3$ g/l | TC g/l | A/TC Ratio | Temp °C. |
| | 16–24 | 115.6 | 175.9 | .657 | 92.2 | 215.6 | .428 | 61.1 |
| 2 | 24–32 | 126.6 | 189.1 | .669 | 92.0 | 222.1 | .416 | 64.4 |
| | 32–40 | 136.0 | 201.4 | .675 | 80.8 | 192.9 | .419 | 67.0 |
| | 40–48 | 126.8 | 190.0 | .667 | 81.2 | 203.7 | .398 | 63.9 |
| 3 | 48–56 | 130.5 | 195.0 | .669 | 78.5 | 189.9 | .413 | 73.2 |
| | 56–64 | 111.8 | 166.2 | .672 | 74.9 | 182.9 | .409 | 72.8 |
| | 64–72 | 111.8 | 166.2 | .672 | 80.2 | 189.9 | .422 | 64.5 |
| RESTART | | | | | | | | |
| 4 | 72–80 | 117.1 | 180.6 | .648 | (2) | (2) | (2) | (2) |
| | 80–88 | 117.1 | 180.6 | .648 | 74.9 | 183.7 | .408 | 58.6 |
| | 88–96 | 126.6 | 196.3 | .645 | 79.3 | 192.3 | .412 | 62.0 |
| 5 | 96–104 | 126.6 | 196.3 | .645 | 84.8 | 198.8 | .427 | 65.3 |
| | 104–112 | 126.6 | 196.3 | .645 | 79.7 | 192.0 | .415 | 65.1 |
| | 112–120 | 139.5 | 202.7 | .688 | 84.4 | 197.3 | .428 | 66.3 |

[1]All values are an average for an 8-hour shift.
[2]No samples taken during first shift after start-up.

TABLE III

OPERATING DATA

| | | Measured Parameters[1] | | | Calculated Parameters[1] | | | |
|---|---|---|---|---|---|---|---|---|
| Day | Period Hours | Liquor Rate ml/min | Seed Rate g/hour | Bed Height meters | Superficial Velocity cm/min | Avg. Bed Density g/l | Retention Time Hours[4] | Al(OH)$_3$ Prod. Rate g/hour |
| 1 | 0–8 | 31.8 | 30.0 | 7.85 | 1.57 | 740 | 8.34 | (3) |
| | 8–16 | 28.2 | 30.0 | 7.55 | 1.39 | 750 | 9.04 | 140.8 |
| | 16–24 | 31.4 | 30.0 | 7.80 | 1.55 | 710 | 8.39 | 129.4 |
| 2 | 24–32 | 37.3 | 30.0 | 7.41 | 1.84 | 740 | 6.71 | 178.3 |
| | 32–40 | 33.9 | 45.0 | 7.12 | 1.67 | 810 | 7.09 | 157.2 |
| | 40–48 | 32.5 | 30.0 | 7.45 | 1.60 | 810 | 7.74 | 158.1 |
| 3 | 48–56 | 33.0 | 52.5 | 7.30 | 1.63 | 850 | 7.47 | 149.3 |
| | 56–64 | 29.6 | 52.5 | 7.18 | 1.46 | 940 | 8.19 | 124.8 |
| | 64–72 | 35.6 | 45.0 | 6.87 | 1.76 | 1010 | 6.52 | 145.6 |
| RESTART | | | | | | | | |
| 4 | 72–80 | 38.4 | 52.5 | 7.85 | 1.89 | 590 | 6.91 | (3) |
| | 80–88 | 37.0 | 45.0 | 8.08 | 1.82 | 550 | 7.38 | 148.7 |
| | 88–96 | 34.8 | 60.0 | 7.46 | 1.72 | 600 | 7.24 | 144.6 |
| 5 | 96–104 | 34.8 | 82.5[2] | 7.31 | 1.72 | 600 | 7.10 | 127.7 |
| | 104–112 | 35.9 | 120.0[2] | 7.78 | 1.77 | 600 | 7.32 | 147.3 |
| | 112–120 | 36.0 | 120.0 | 7.50 | 1.78 | 680 | 7.04 | 172.0 |

[1]All values are an average for an 8-hour shift.
[2]Plus 908 grams added to increase bed level.
[3]No samples taken during first shift after start-up.
[4]Retention Time-Calculated based on total volume occupied by seed bed divided by liquor feed rate. Actual Liquor-Seed contact time is less than indicated retention time because of volume occupied by seed.
Product: 178.3 grams Al(OH)$_3$/hr = 5.9
Seed: 30 grams Al(OH)$_3$/hr

TABLE IV

SIZE AND RESISTANCE TO BREAKAGE DATA FOR DENSE PHASE PRECIPITATION PRODUCT

| Day | Period | Seed Rate | | Al(OH)$_3$ Particle Size (wt %) | | | | | | Attrition Index[1] |
|---|---|---|---|---|---|---|---|---|---|---|
| | Hours | g/hour | Mesh | +100 | −100 | −150 | −200 | −270 | −325 | |
| | | | Microns | +149 | −149 | −105 | −74 | −53 | −44 | |
| | | | Seed[2] | 0.54 | 99.46 | 96.22 | 36.02 | 10.28 | 3.88 | 9.70 |
| 1 | 0–8 | 30.0 | | 13.68 | 86.32 | 39.06 | 1.90 | 0.41 | 0.35 | 1.40 |
| | 8–16 | 30.0 | | 17.00 | 83.00 | 42.20 | 1.56 | 0.12 | 0.08 | 4.28 |
| | 16–24 | 30.0 | | 35.28 | 64.72 | 9.22 | 0.14 | 0.03 | 0.03 | 2.50 |
| 2 | 24–32 | 30.0 | | 44.88 | 55.12 | 9.92 | 0.06 | 0.06 | 0.06 | 5.76 |
| | 32–40 | 45.0 | | 50.98 | 49.02 | 4.02 | 0.04 | 0.04 | 0.04 | 11.60 |
| | 40–48 | 30.0 | | 68.82 | 31.18 | 0.56 | 0.26 | 0.26 | 0.26 | 12.70 |
| 3 | 48–56 | 52.5 | | 65.82 | 34.18 | 0.88 | 0.05 | 0.05 | 0.05 | 15.62 |
| | 56–64 | 52.5 | | | NO SAMPLE TAKEN | | | | | |
| | 64–72 | 45.0 | | 51.92 | 48.08 | 9.42 | 0.60 | 0.06 | 0.06 | 7.54 |
| RESTART | | | | | | | | | | |
| 4 | 72–80 | 52.5 | | 19.02 | 80.98 | 32.48 | 5.08 | 1.0 | 0.70 | 1.84 |
| | 80–88 | 45.0 | | 20.50 | 79.50 | 28.84 | 2.12 | 0.66 | 0.14 | 2.04 |
| | 88–96 | 60.0 | | 29.24 | 70.76 | 23.82 | 1.90 | 0.40 | 0.38 | 4.56 |
| 5 | 96–104 | 82.5 | | 45.50 | 54.50 | 12.92 | 0.42 | 0.16 | 0.08 | 2.50 |
| | 104–112 | 120.0 | | 60.10 | 39.90 | 5.10 | 0.48 | 0.20 | 0.18 | 4.19 |

TABLE IV-continued
SIZE AND RESISTANCE TO BREAKAGE DATA FOR DENSE PHASE PRECIPITATION PRODUCT

| Day | Period | Seed Rate | Al(OH)$_3$ Particle Size (wt %) | | | | | | Attrition Index[1] |
|---|---|---|---|---|---|---|---|---|---|
| | 112–120 | 120.0 | 49.12 | 50.88 | 12.16 | 0.72 | 0.20 | 0.04 | 3.67 |

[1] Modified version of Forsythe-Hertwig attrition test
Note: Al(OH)$_3$ sample was calcined @1040° C. prior to testing
[2] 90 micron average diameter

TABLE V
CONCENTRATION SUSPENSION DENSITY AND SIZE GRADATIONS ESTABLISHED IN THE DENSE PHASE PRECIPITATOR

| Height in Bed | Solids Density in seed Bed Suspension | A/TC Ratio | Al(OH)$_3$ Particle Size (wt %) | | | | | | Attrition Index (1) |
|---|---|---|---|---|---|---|---|---|---|
| meters | g/l | | Mesh +100 | −100 | −150 | −200 | −270 | −325 | |
| | | | Micron +149 | −149 −105 | −105 −74 | −74 −53 | −53 −44 | −44 | |
| 0 | 702 | 0.621 | 39.24 | 60.76 | 25.46 | 3.80 | 0.36 | 0.18 | 4.51 |
| 1 | 721 | 0.561 | 24.72 | 75.28 | 64.68 | 6.80 | 3.46 | 0.36 | 6.06 |
| 2 | 672 | 0.500 | 9.00 | 91.00 | 72.62 | 22.42 | 3.46 | 0.68 | 7.27 |
| 3 | 686 | 0.476 | 3.58 | 96.42 | 87.36 | 26.90 | 16.90 | 1.38 | 10.13 |
| 4 | 691 | 0.488 | 7.08 | 92.92 | 79.90 | 31.02 | 4.96 | 1.02 | 8.92 |
| 5 | 634 | 0.478 | 3.72 | 96.28 | 88.52 | 37.90 | 20.52 | 2.10 | 15.18 |
| 6 | 516 | 0.459 | 0.70 | 99.30 | 95.48 | 59.54 | 13.82 | 4.58 | 9.73 |
| 7 | 496 | 0.450 | 0.40 | 99.60 | 96.90 | 69.02 | 43.78 | 8.04 | 26.57 |

(1) Modified version of Forsythe-Hertwig Attrition Test
Note: Al(OH)$_3$ sample was calcined @1040° C. prior to testing A single column was used in these experiments and it appears that a preferred commercial embodiment of the invention will include a number of single columns in parallel. It would be possible to put a number of columns containing less deep seed beds in series to replace the proposed single column.

Thus, it can be seen that the invention provides a much simpler precipitation process, requiring less precipitation equipment, eliminating the need for classification of product, reducing the quantity of seed needed for a given product yield, and resulting in a superior precipitation product having enhanced physical properties.

Having thus described the invention, what is claimed is:

1. A process for the precipitation of Al(OH)$_3$ from a supersaturated green liquor which comprises:
   (a) feeding the supersaturated green liquor into the bottom of a precipitation chamber containing a suspension of liquor and seed particles;
   (b) feeding seed particles of Al(OH)$_3$ into the top of said precipitation chamber at a rate sufficient to maintain a solids density in the seed suspension of from 500–1100 grams/liter in the chamber and a relatively unchanging seed bed suspension height;
   (c) maintaining the flow of green liquor into the bottom of said reaction chamber at a velocity sufficient to maintain said seed particles in suspension while maintaining a liquor concentration gradient with respect to dissolved alumina within said chamber, the rate of flow of green liquor into the bottom of the chamber being preselected to maintain the Al(OH)$_3$ particles in suspension without the turbulence of a fluidized bed;
   (d) recovering precipitated Al(OH)$_3$ from said chamber in the form of product having particles in the size range about between 50 and 150 microns; and
   (e) overflowing spent liquor from the top of the precipitation chambers.

2. The process of claim 1 wherein the superficial velocity of the liquor flow within said chamber is 1–3 cm/minute.

3. The process of claim 1 wherein said green liquor is introduced and distributed uniformly over the bottom area of said chamber.

4. A process for the precipitation of Al(OH)$_3$ from a supersaturated green liquor which comprises:
   (a) feeding the supersaturated green liquor through a rotating sparger into the bottom of a precipitation chamber containing a suspension of liquor and seed particles;
   (b) feeding seed particles of Al(OH)$_3$ into the top of said precipitation chamber at a rate sufficient to maintain a solids density in the seed suspension of from 500–1100 grams/liter in the chamber and a relatively unchanging seed bed suspension height;
   (c) maintaining the flow of green liquor into the bottom of said reaction chamber at a velocity sufficient to maintain said seed particles in suspension while maintaining a liquor concentration gradient with respect to dissolved alumina within said chamber;
   (d) recovering precipitated Al(OH)$_3$ from said chamber; and
   (e) overflowing spent liquor from the top of the precipitation chambers.

5. The process of claim 4 wherein the number of arms and the rotational speed of the rotating sparger are selected to insure that a sparger arm sweeps past a given point in the cross section of the chamber at least as often as every 3 seconds.

6. The process of claim 5 wherein the rotating sparger has adequate numbers and sizes of holes to assure uniform distribution without excessive pressure drop of the required liquor flow necessary to provide a superficial velocity within the chamber of 1–3 cm/minute.

7. The process of claim 6 wherein said holes in the said sparger arms are located facing the direction of rotation of said sparger arms to assist rotation of said arms.

* * * * *

UNITED STATES PATENT AND TRADEMARK OFFICE
CERTIFICATE OF CORRECTION

PATENT NO. : 4,530,699
DATED : July 23, 1985
INVENTOR(S) : Allen H. Schlesinger et al It is certified that error appears in the above-identified patent and that said Letters Patent is hereby corrected as shown below:

| | |
|---|---|
| Col. 3, line 3 | After "particles", insert --of seed size--. |
| Col. 4, line 21 | Change "ares" to --area--. |
| Col. 5, lines 59-60 | After "Al(OH)$_3$", delete "of hydrate". |
| Col. 6, line 44 | After "Al(OH)$_3$", insert --particle--. |
| Col. 7, Table III | Change "178.3" for Day 2, Period 24-32, in the rightmost column to --178.3$^{(5)}$--. |
| Col. 7, Table III | Change the last two lines at the foot of the Table to: <br> --(5) Product to seed ratio = (178.3 grams Al(OH)$_3$/hr)/ (30 grams Al(OH)$_3$/hr) = 5.9.-- |

Signed and Sealed this

Twenty-sixth Day of November 1985

[SEAL]

Attest:

DONALD J. QUIGG

Attesting Officer

Commissioner of Patents and Trademarks